(12) United States Patent
Kim

(10) Patent No.: US 8,816,819 B2
(45) Date of Patent: Aug. 26, 2014

(54) DYNAMIC INFORMATION RADIO-FREQUENCY IDENTIFICATION (RFID) CARD WITH BIOMETRIC CAPABILITIES

(76) Inventor: Moon J. Kim, Wappingers Falls, NY (US)

(*) Notice: Subject to any disclaimer, the term of this patent is extended or adjusted under 35 U.S.C. 154(b) by 696 days.

(21) Appl. No.: 13/033,946

(22) Filed: Feb. 24, 2011

(65) Prior Publication Data

US 2012/0218079 A1    Aug. 30, 2012

(51) Int. Cl.
*G06F 7/04* (2006.01)

(52) U.S. Cl.
USPC ........................................ 340/5.83; 340/5.82

(58) Field of Classification Search
CPC    G06F 21/32; G07C 9/00087; G07C 9/00158; G07C 2009/00095; A61B 5/117; G06K 9/00; G06Q 20/40145
USPC ........ 340/5.83, 5.61, 10.4, 539.13, 542, 5.51, 340/5.53, 5.65, 5.67, 5.82
See application file for complete search history.

(56) References Cited

U.S. PATENT DOCUMENTS

| | | | |
|---|---|---|---|
| 5,467,403 A | 11/1995 | Fishbine et al. | |
| 6,178,255 B1 | 1/2001 | Scott et al. | |
| 6,212,290 B1 | 4/2001 | Gagne et al. | |
| 6,628,813 B2 | 9/2003 | Scott et al. | |
| 6,938,823 B2 | 9/2005 | Boccacci | |
| 7,028,893 B2* | 4/2006 | Goodman et al. | 235/380 |
| 7,786,868 B2 | 8/2010 | Forster | |
| 7,814,332 B2 | 10/2010 | Beenau et al. | |
| 2004/0129787 A1* | 7/2004 | Saito et al. | 235/492 |
| 2005/0141263 A1* | 6/2005 | Umeda et al. | 365/149 |
| 2005/0207624 A1* | 9/2005 | Ehlers et al. | 382/124 |
| 2006/0140460 A1* | 6/2006 | Coutts | 382/124 |
| 2006/0170530 A1 | 8/2006 | Nwosu et al. | |
| 2006/0202032 A1 | 9/2006 | Kricorissian | |
| 2006/0224504 A1 | 10/2006 | Nwosu et al. | |
| 2007/0033150 A1 | 2/2007 | Nwosu | |
| 2007/0285244 A1 | 12/2007 | Tucker et al. | |
| 2008/0040274 A1 | 2/2008 | Uzo | |
| 2008/0180249 A1 | 7/2008 | Butler et al. | |
| 2008/0278325 A1 | 11/2008 | Zimman et al. | |
| 2009/0085750 A1 | 4/2009 | Waldner et al. | |
| 2009/0289773 A1 | 11/2009 | Hoyt et al. | |
| 2010/0030693 A1* | 2/2010 | Beenau et al. | 705/64 |
| 2010/0082444 A1 | 4/2010 | Lin et al. | |
| 2010/0201488 A1 | 8/2010 | Stern et al. | |

* cited by examiner

*Primary Examiner* — Omer S Khan
(74) *Attorney, Agent, or Firm* — Maxine L. Barasch; Keohane & D'Alessandro, PLLC

(57) ABSTRACT

Embodiments of the present invention implement dynamic elements within a RFID card. Specifically, the embodiments update card information dynamically, using a biometric image scanner (e.g., for scanning a fingerprint passively). The scanner is activated only when a user intends to use it with a designated reader by bringing the RFID card within the reader RF field range, thus preventing unauthorized reader's RFID scan. Even if an unauthorized reader comes into contact with the RFID card, the reader cannot read the user's biometric information, unless the user holds the card for use by the reader. Thus, unauthorized biometric information scanning is effectively prevented. The medium owned and controlled by the user collects a biometric fingerprint image for safety and security. When a card is swiped by the user, the biometric imaging array sensor captures user fingerprints and transfers the corresponding image data to a verification system to match and track user biometric information with a predefine accuracy, and track changes of repeated uses.

9 Claims, 22 Drawing Sheets

DYNAMIC INFORMATION RADIO-FREQUENCY IDENTIFICATION (RFID) CARD WITH BIOMETRIC CAPABILITIES

FIELD OF THE INVENTION

In general, the present invention relates to radio-frequency identification (RFID). Specifically, the present invention relates to a RFID card having a biometric scanner for additional user authentication.

BACKGROUND OF THE INVENTION

Over recent years, RFID has become an increasing function of providing wireless communications. For example, RFID is commonly implemented in security devices (e.g., swipers and/or card readers) for businesses as well as in many other areas. Unfortunately, RFID is typically passive and has its range limited by distance and physical obstacles. Moreover, RFID reader power is limited by regulation, which causes range issues since RFID operational range is constrained by the available power. As such, RFID reliability, responsiveness, and functionality are commonly compromised in practical environments.

In most cases, the credit and identification card authentication relies on the static information stored in a magnetic stripe, embossed letter, signature, security code, holographic image, and photo of the card. While a smart card contains a smart chip, it is still static in nature. Current credit card implementation relies on the identification card medium which is subject to loss. All the static information stored in the credit card (and other types of cards) is vulnerable to manipulation and duplication. In its current implementation, the card cannot actively identify the card holder as the legitimate owner efficiently, since the card does not have any intelligence.

The related art has failed to provide such functionality, including those references listed below:

U.S. Pat. No. 5,467,403 depicts a fingerprint scanning apparatus that is neither portable nor integrated with smaller devices.

U.S. Pat. No. 6,212,290 ('290) provides non-minutiae automatic fingerprint identification system and methods. Unfortunately, the teachings of '290 require a separate fingerprint scanner.

U.S. Pat. No. 6,938,823 ('823) discloses a portable apparatus for scientific identification of an individual. However, '823 requires a separate laptop computer for making the identification.

U.S. Pat. Nos. 6,628,813 and 6,178,255 disclose individualized fingerprint scanners. However, both fail to teach integration within a RFID card and require bulky parts for mechanical movement.

In view of the foregoing, none of the related art teaches an integrated biometric reader/scanner within a RFID card for dynamic (as well as static) authentication of a user.

SUMMARY OF THE INVENTION

Embodiments of the present invention implement dynamic elements within a RFID card. Specifically, the embodiments update card information dynamically, using a biometric image scanner (e.g., for scanning a fingerprint passively). The scanner is activated only when a user intends to use it with a designated reader by bringing the RFID card within the reader RF field range, thus preventing unauthorized reader's RFID scan. Even if an unauthorized reader comes into contact with the RFID card, the reader cannot read the user's biometric information, unless the user holds the card for use by the reader. Thus, unauthorized biometric information scanning is effectively prevented. The medium owned and controlled by the user collects a biometric fingerprint image for safety and security.

Under these embodiments, the owner of the medium can be actively identified by adding biometric fingerprint information during the verification process. When a card is swiped by the user, the biometric imaging array sensor captures user fingerprints and transfers the corresponding image data to a verification system to match and track user biometric information with a predefine accuracy, and track changes of repeated uses. The fingerprint image is taken through the image sensor and integrated into the card's customary user holding area A first aspect of the present invention provides a dynamic information radio-frequency identification (RFID) card, comprising: a RFID card medium; and a biometric scanner positioned on the card medium for receiving a biometric reading from a user, and for authenticating the user based on the biometric reading.

A second aspect of the present invention provides a dynamic information radio-frequency identification (RFID) card, comprising: a RFID card medium; a RFID chip positioned in the RFID card medium for enabling RFID-based authentication of a user; and a biometric scanner positioned on the card medium for receiving a biometric reading from the user, and for authenticating the user based on the biometric reading, the biometric scanner comprising a sensor array for capturing analog biometric image data.

A third aspect of the present invention provides a dynamic information radio-frequency identification (RFID) card: a RFID card medium; a RFID chip positioned in the RFID card medium for enabling RFID-based authentication of a user; a smart chip positioned in the RFID card medium for enabling further authentication of the user based on data stored in the smart chip; and a biometric scanner positioned on the card medium for receiving a biometric reading from the user, and for authenticating the user based on the biometric reading, wherein the biometric scanner comprises a sensor array for capturing analog biometric image data, and wherein the sensor array comprises a series of sensor elements arranged in a column-row format.

BRIEF DESCRIPTION OF THE DRAWINGS

These and other features of this invention will be more readily understood from the following detailed description of the various aspects of the invention taken in conjunction with the accompanying drawings in which.

Figure 1:
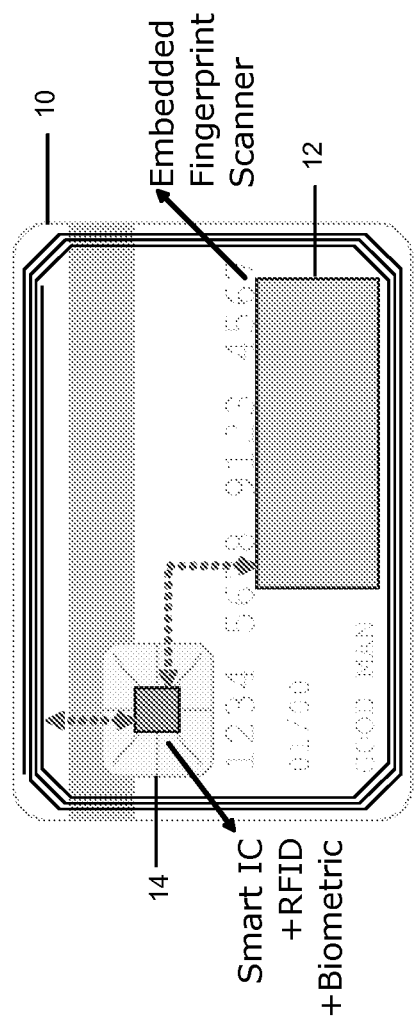
FIG. 1 depicts a RFID card having biometric capabilities according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:

I. General Description of the Invention
II. Illustrative Embodiments

I. General Description of the Invention

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, RFID is a technology that incorporates the use of electromagnetic or electrostatic coupling in the radio frequency (RF) portion of the electromagnetic spectrum to uniquely identify an object, animal, or person. RFID is coming into increasing use in the industry as an alternative to the bar code. The advantage of RFID is that it does not require direct contact or line-of-sight scanning. A RFID system consists of three components: an antenna and transceiver (often combined into one reader) and a transponder (the tag). The antenna uses radio frequency waves to transmit a signal that activates the transponder. When activated, the tag transmits data back to the antenna. The data is used to notify a programmable logic controller that an action should occur. The action could be as simple as raising an access gate or as complicated as interfacing with a database to carry out a monetary transaction. Low-frequency RFID systems (e.g., 30 KHz to 500 KHz) have short transmission ranges (generally less than six feet). High-frequency RFID systems (850 MHz to 950 MHz and 2.4 GHz to 2.5 GHz) offer longer transmission ranges (more than 90 feet). RFID is sometimes called dedicated short-range communication (DSRC).

RFID tags and labels (collectively referred to herein as "devices" or "transponders") are widely used to associate an object with an identification code or other information. RFID devices generally have a combination of antennas and analog and/or digital electronics, which may include, for example, communications electronics, data memory, and control logic. For example, RFID tags are used in conjunction with security locks in cars, for access control to buildings, and for tracking inventory and parcels. As noted above, RFID devices are generally categorized as labels or tags. RFID labels are RFID devices that are adhesive or otherwise have a surface attached directly to objects. RFID tags, in contrast, are secured to objects by other means (for example, by use of a plastic fastener, string, or other fastening means).

RFID devices include: (1) active tags and labels, which include a power source for broadcasting signals; and (2) passive tags and labels, which do not. In the case of passive devices, in order to retrieve the information from the chip, a "base station" or "reader" sends an excitation signal to the RFID tag or label. The excitation signal energizes the tag or label, and the RFID circuitry transmits the stored information back to the reader. The RFID reader receives and decodes the information from the RFID tag. In general, RFID tags can retain and communicate enough information to uniquely identify individuals, packages, inventory, and the like. RFID tags and labels also can be characterized as those to which information is written only once (although the information may be read repeatedly), and those to which information may be written repeatedly during use. For example, RFID tags may store environmental data (that may be detected by an associated sensor), logistical histories, state data, etc.

Along these lines, RFID devices can be further characterized as passive, semi-passive, and active. Passive RFID devices have no internal power supply. Power for operation of passive RFID devices is provided by the energy in an incoming radio frequency signal received by the device. Most passive RFID devices signal by backscattering the carrier wave from an RF reader. Passive RFID devices have the advantage of simplicity and long life, although performance of them may be limited.

As indicated above, embodiments of the present invention implement dynamic elements within a RFID card. Specifically, the embodiments update card information dynamically, using a biometric image scanner (e.g., for scanning a fingerprint passively). The scanner is activated only when a user intends to use it with a designated reader by bringing the RFID card within the reader RF field range, thus preventing unauthorized reader's RFID scan. Even if an unauthorized reader comes into contact with the RFID card, the reader cannot read the user's biometric information, unless the user holds the card for use by the reader. Thus, unauthorized biometric information scanning is effectively prevented. The medium owned and controlled by the user collects a biometric fingerprint image for safety and security.

Among other things, these embodiments provide the following advantages:

- In most cases, the credit card authentication can only be verified by the information that is stored in the magnetic strip of the smart IC card. This allows unauthorized others to use the card. When a credit card is lost, then the user calls the credit service center to deactivate the card. As a user holds on average 10 credit cards, this becomes a real problem. With the biometric fingerprint dynamic RFID proposed, the cards are not usable when the user is not present.
- The passive biometric image identification adds a higher level security on the current credit card implementation. Other biometric authentication such as voice was used. This can be very inconvenient for the user. Moreover, it requires bulkier authentication devices, which is one of the inhibitors of biometric authentication.
- The embodiments of the invention can be applied to many other applications such as an ATM where more secure authentication is offered.
- The embodiments of the invention provide a higher level security of the identification without adding a more complicated authentication process or further card-user action.

Referring to FIG. 1, a RFID card 10 having biometric capabilities according to an embodiment of the present invention is shown. As depicted, card 10 includes a RFID device and/or smart chip/IC 14 as well as a biometric scanner 12. It is understood that the RF device/component, smart chip, and biometric scanner 12 can be incorporated into a single unit, or two or more separate units. It is understood that scanning area 12 is not necessarily limited and/or constrained in size, shape, position, and/or configuration as shown in FIG. 1. For example, scanner 12 can cover any portion of the front or back of card 10. In any event, using these capabilities, card 10 implements a conventional static solution with fingerprint (or other biometric-based) imaging authentication. In at least one embodiment, user fingerprints are captured when the user holds the card for: swiping (magnetic+RFID card reader); holding (RFID reader); and/or inserting (smart IC reader).

Figure 2:
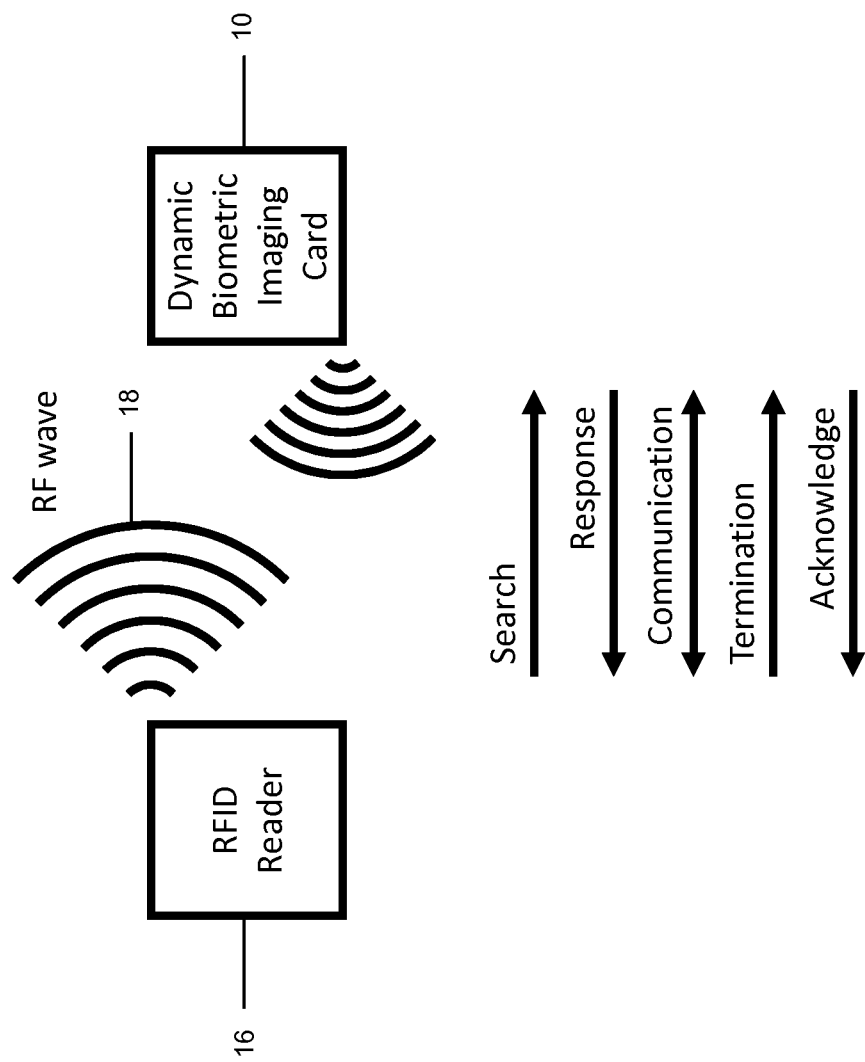
FIG. 2 depicts a RFID communication diagram according to an embodiment of the present invention.

Referring now to FIG. 2, a RFID communication diagram according to an embodiment of the present invention is shown. As depicted, FIG. 2 includes a dynamic biometric imaging card 10 that communicates with a RFID reader 16 via RF waves. In a typical embodiment, RFID reader 16 will search for RFID devices such as card 10, which will respond in kind. Communication occurs between the two points, and, once terminated, card 10 will so acknowledge.

Figure 3:
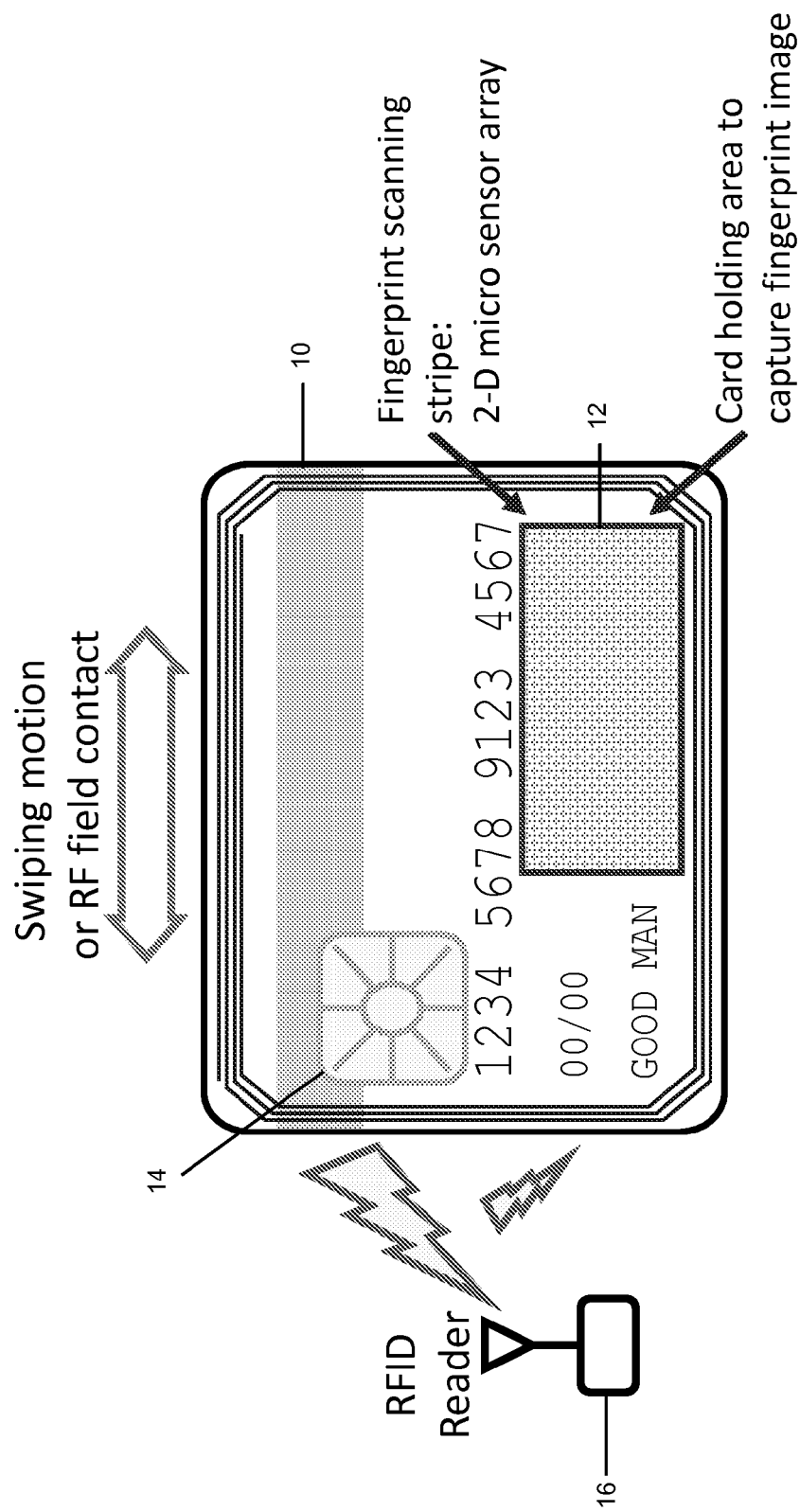
FIG. 3 depicts fingerprint RFID use with RF access according to an embodiment of the present invention.
Figure 4:
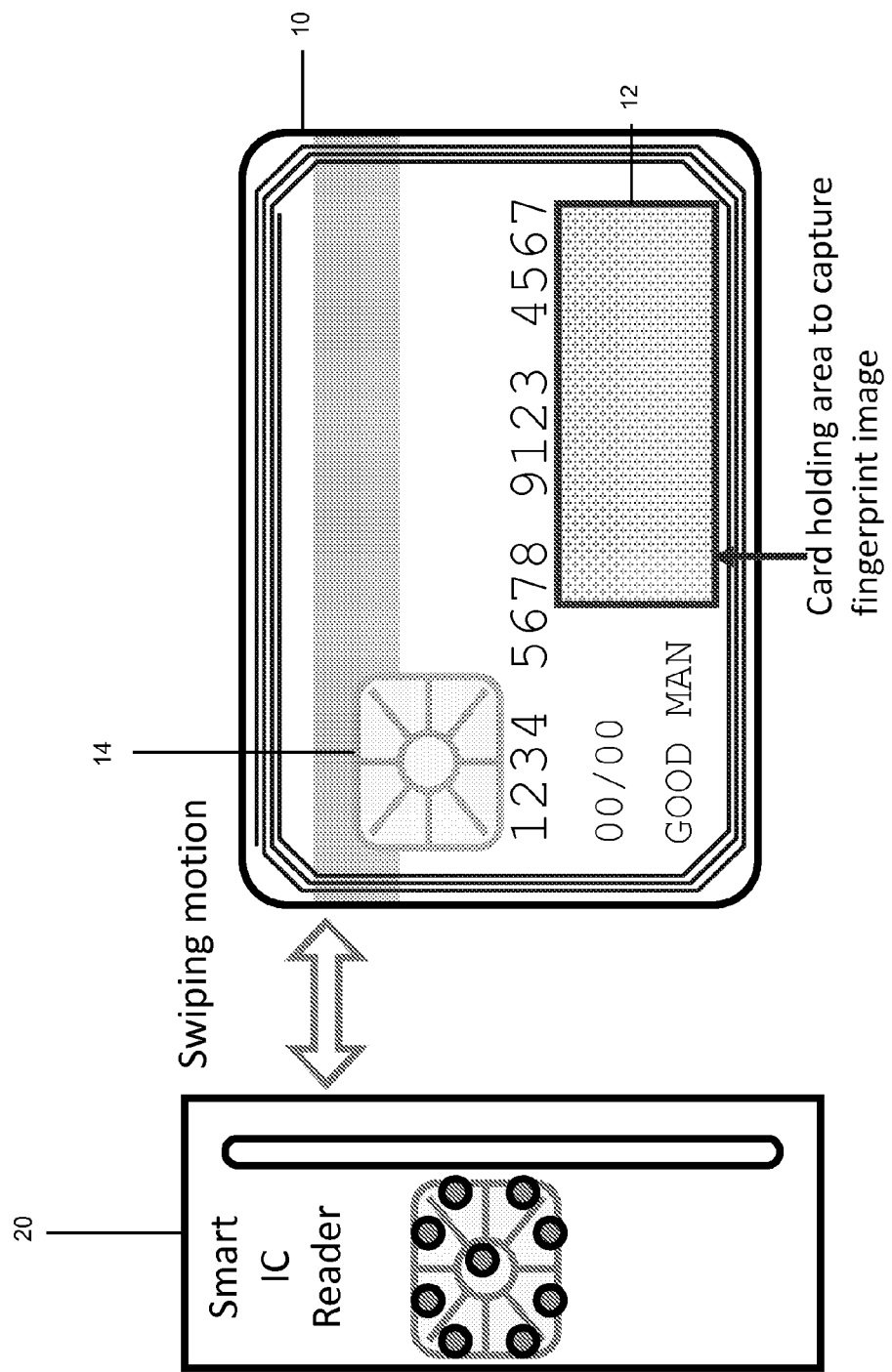
FIG. 4 depicts biometric RFID use with a smart IC/chip according to an embodiment of the present invention.

Referring now to FIG. 3, interaction of card 10 with RFID reader 16 is shown in greater detail. In general, a user will swipe or place his/her finger over biometric scanner 12. Then, using a swiping or waving motion, biometric image data will be communicated to RFID reader 16 using RFID communication techniques. Specifically, static information such as RFID and/or smart chip information will be communicated along with dynamic information such as biometric image data to reader 16 where it will be used to authenticate the user. A similar embodiment is shown in FIG. 4, only with a smart chip/IC reader 20. A user will swipe or place his/her finger over biometric scanner 12. Upon swiping card 10 in reader 20, the static RFID and smart chip/IC information as well as dynamic biometric image data will be transmitted to reader 20 for validation. As shown, validation is performed by comparing the static and dynamic information against a database of known information to verify the user.

Figure 5:
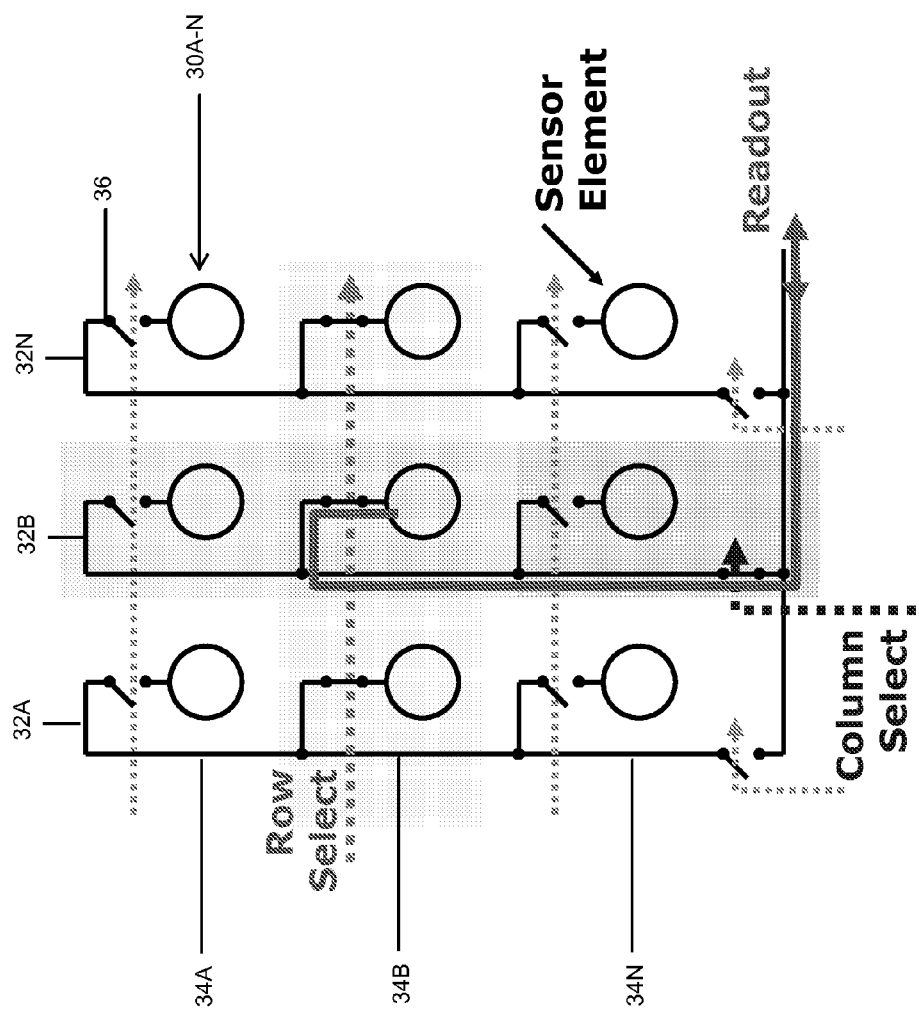
FIG. 5 depicts an imaging sensor array according to an embodiment of the present invention.
Figure 6:
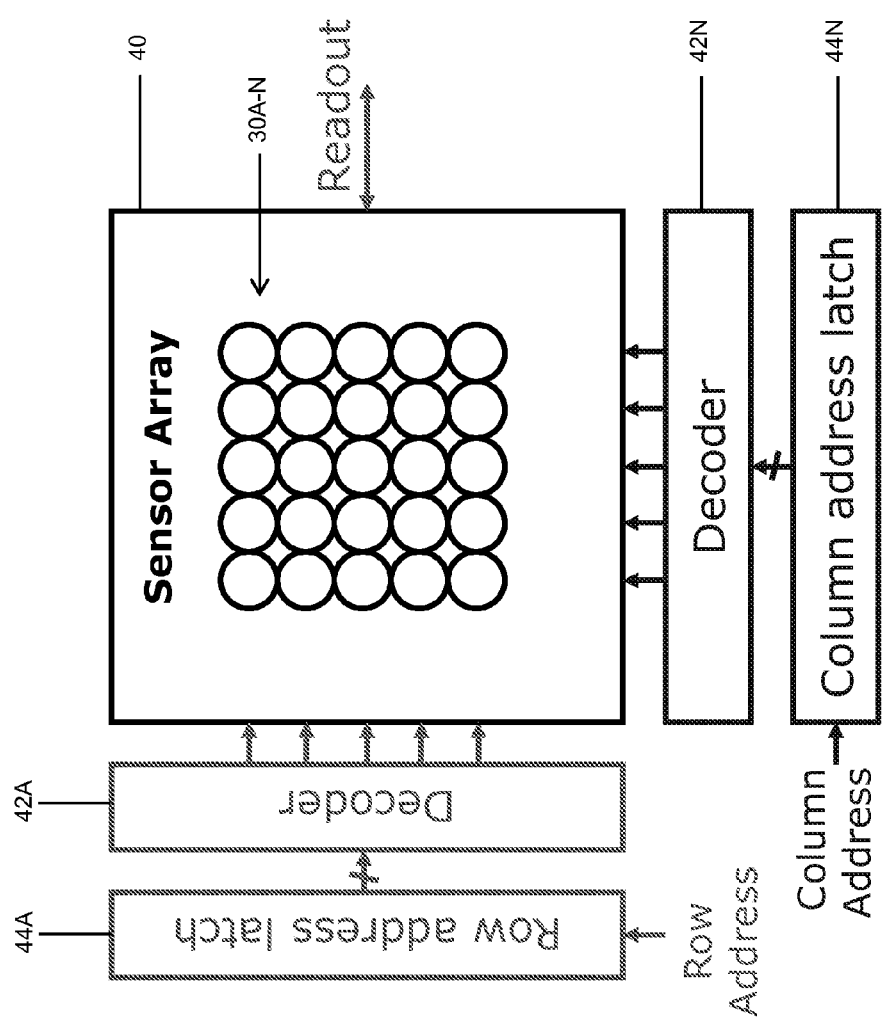
FIG. 6 depicts an imaging sensor array addressing scheme according to an embodiment of the present invention.

In general, FIGS. 5-9 depict the configuration and function of biometric scanner 12 (also referred to herein as imaging sensor). As first shown, FIG. 5 depicts an imaging sensor array organizational diagram according to an embodiment of the present invention. Specifically, a series/array of sensor elements 30A-N is arranged in a column 32A-N-row 34A-N format. Other elements such as switches 36 interconnect sensor elements 30A-N. The format depicted allows a complete and accurate biometric image to be taken (e.g., of a user's fingerprint) for authentication. FIG. 6 depicts an imaging sensor array addressing scheme diagram according to an embodiment of the present invention. As shown, sensor array 40 (comprising sensor elements 30A-N) is coupled to a set of decoders 42A-N, which themselves are coupled to row address latch 44A and column address latch 44N, respectively. As will be further described below, image data (e.g., of a fingerprint) will be captured in analog format and then converted to a digital format for transmission to the RFID reader and authentication against a database of known fingerprint-users.

Figure 7:
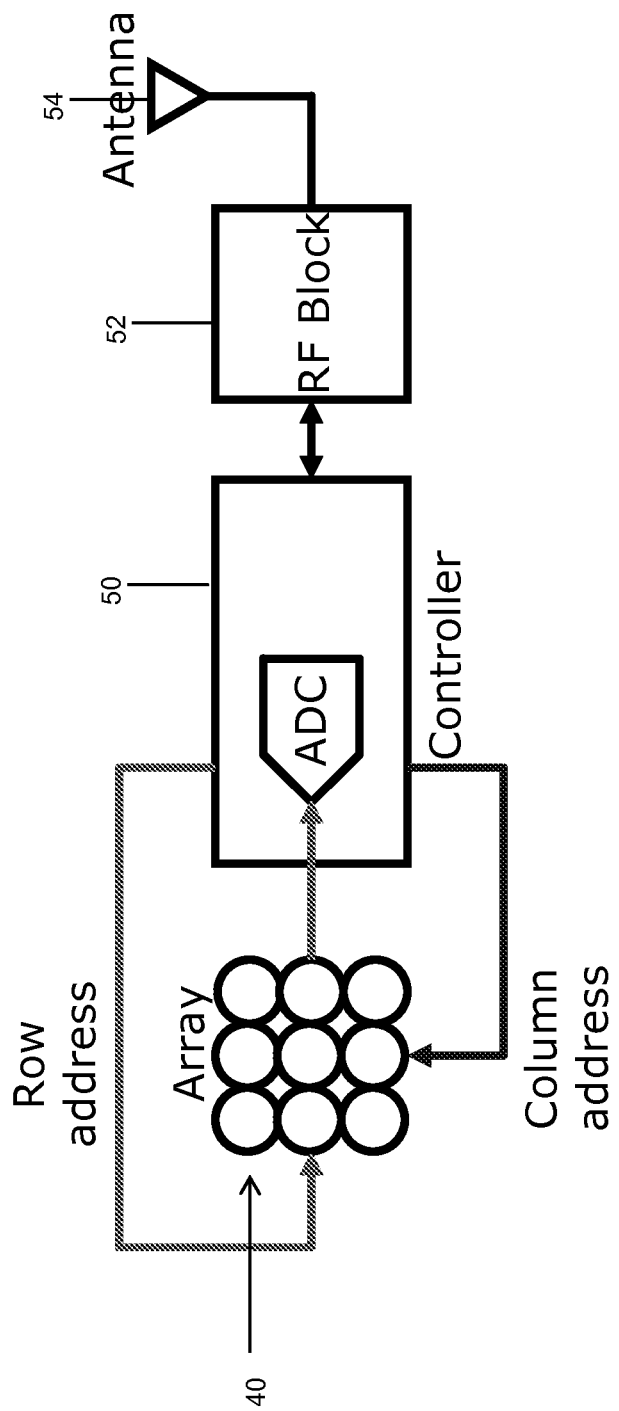
FIG. 7 depicts an imaging sensor array readout block diagram according to an embodiment of the present invention.
Figure 8:
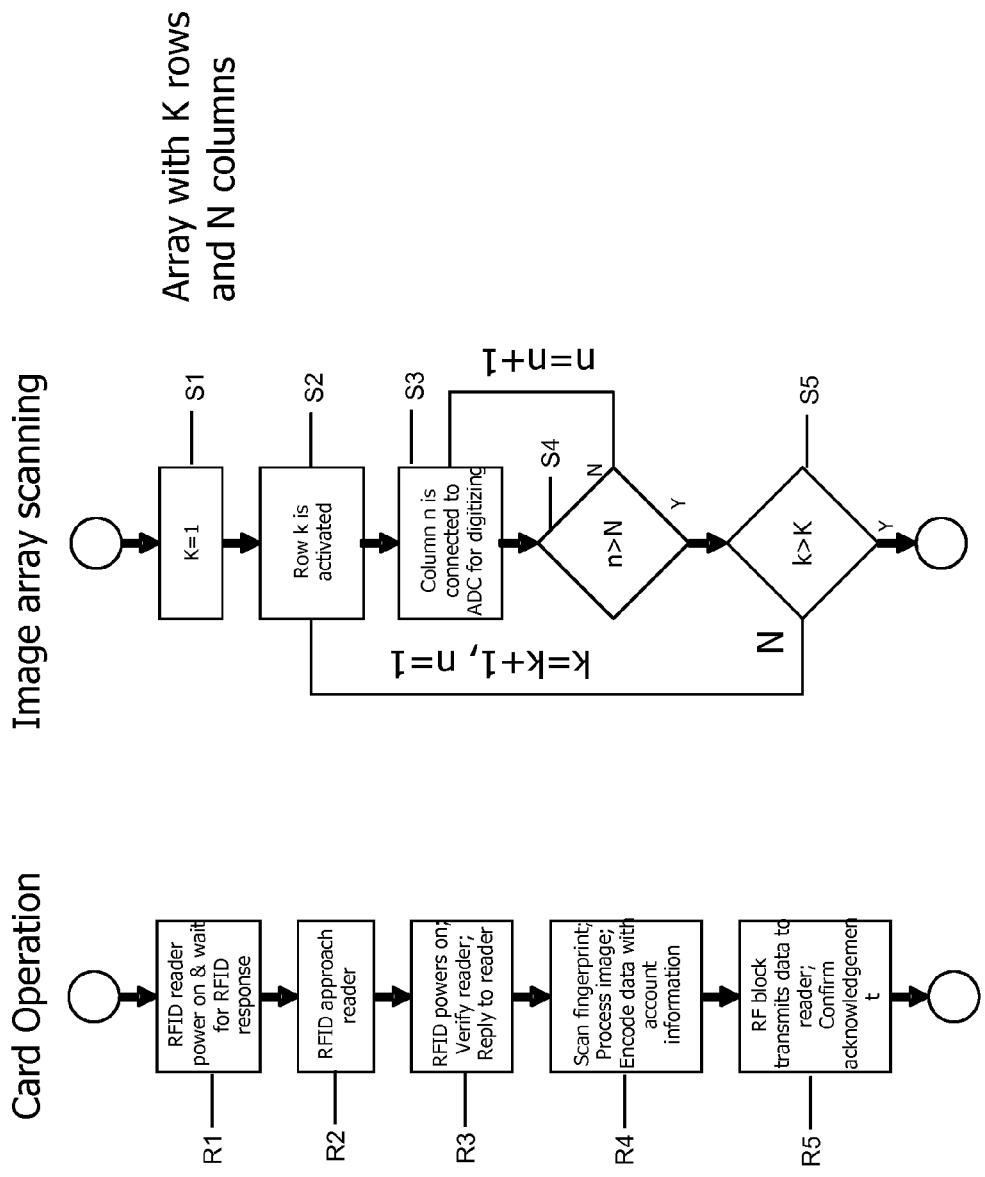
FIGS. 8A-B depict operational flow charts according to an embodiment of the present invention.

Referring now to FIG. 7, an imaging sensor array readout block diagram according to an embodiment of the present invention is shown. As shown, the diagram depicts sensor array 40 coupled to a controller 50, which is coupled to RF block 52 and antenna 54. In general, biometric image data is captured by sensor array 40 (e.g., in analog format), processed (e.g., converted to a digital format), and transmitted through RF block 52 and antenna 54 to a RFID reader. Specifically, the multi-dimensional sensor array 40 is scanned for fingerprint imaging when a user holds a RFID card near a RFID reader. A row is then selected and set up for readout. Column(s) are read through readout circuit(s), which can produce single or parallel readout. As mentioned above, the readout undergoes an analog-to-digital conversion.

FIGS. 8A-B depict operational flow charts according to an embodiment of the present invention. Specifically, FIG. 8A shows card operation in the RFID environment according to an embodiment of the present invention. As depicted, in step R1, the RFID reader powers on and waits for RFID response from the RFID card. In step R2, the RFID card approaches/is placed in close proximity to the RFID reader. In step R3, the RFID card powers on, and verifies and replies to the RFID reader. In step R4, a fingerprint scan is made and the image data is processed and encoded with account information (e.g., from the RFID chip and/or the smart chip/IC). Then, in step R5, the RF block of the image scanner transmits the collective data (e.g., RFID and smart chip/IC) and dynamic (e.g., biometric) information to the RFID reader and confirms acknowledgement. FIG. 8B shows an image array scanning flow chart with "K" rows and "N" columns according to an embodiment of the present invention. As shown, in step S1, K=1, which causes row "k" to be activated in step S2. In step S3, column "n" is connected to the controller/ADC for digitizing the image data (from analog format). In step S4, it is determined whether "n>N". If not, "n" is set to "n+1", and the process returns to step S3. If so, the process proceeds to step S5 where it is determined whether "k>K". If not, "k" is set to "k+1" and "n" is set to "1". Once "k>K", the process can end.

Figure 9:
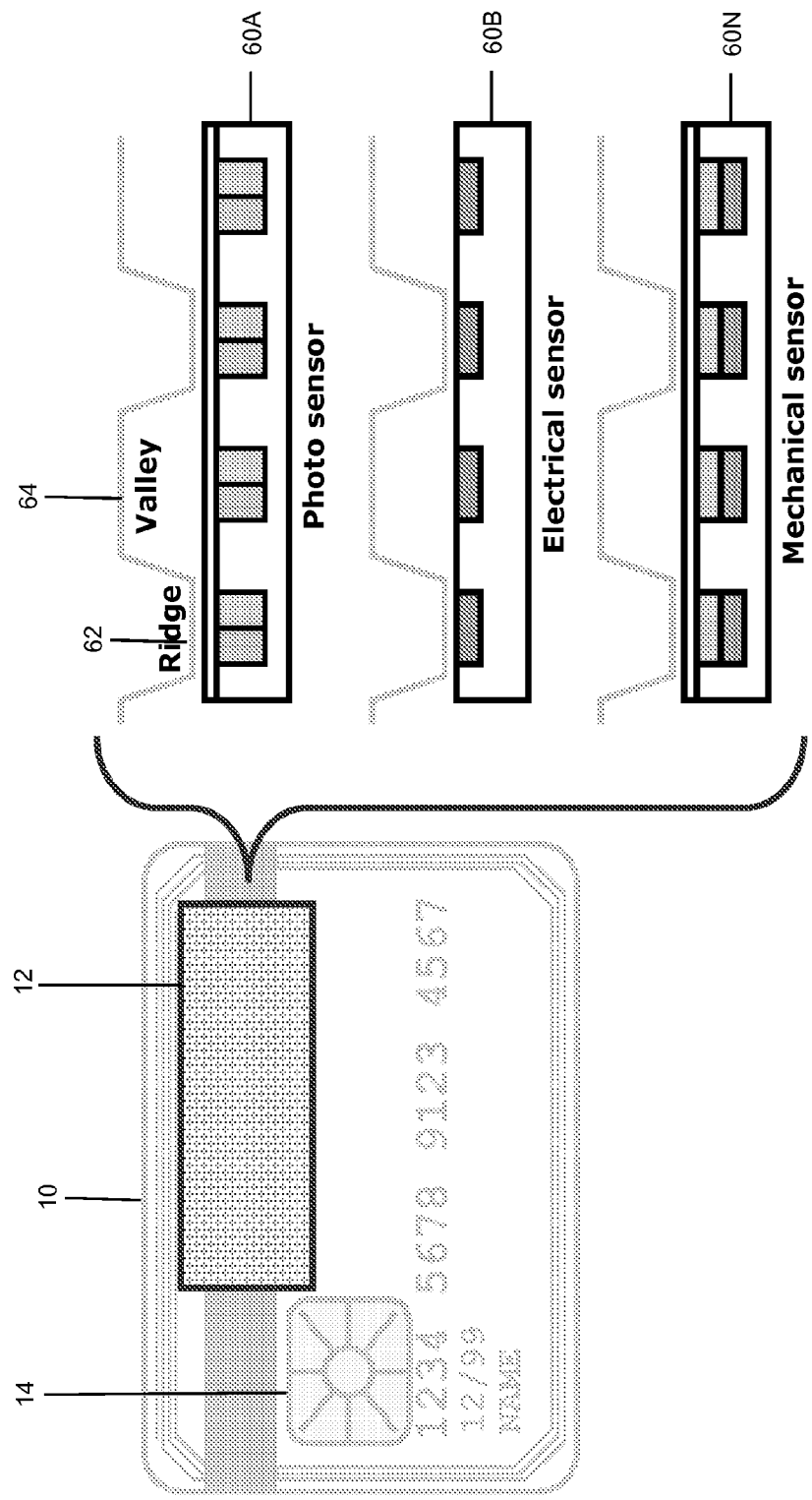
FIG. 9 depicts fingerprint sensor array mechanisms according to an embodiment of the present invention.

Referring now to FIG. 9, biometric (e.g., fingerprint) sensor array mechanisms according to an embodiment of the present invention are shown. As depicted, scanner 12 can include multiple types of sensors. Examples shown include photo sensor 60A (semiconductor photo detectors sensitive to visual and IR spectrum), electrical sensor 60B (active and passive capacitive coupling sensor, RF-based sensor), and/or mechanical sensor 60N (pressure using piezo-electronic material, ultrasound transmission and reflection sensor). Each sensor 60A-N measures/detects/scans ridge 62 and valley 64 in fingerprints or the like.

In general, sensor array 40 is implemented on semiconductor substrate and transferred to a plastic card surface 10 (FIG. 1). Along these lines, sensory array 40 can be implemented on thin elastic material and can be embedded on the card surface. Alternatively, sensory array 40 can be integrated on the plastic card 10 itself using conventional multi-layer printed circuit board manufacturing. Regardless, sensory array 40 is a flexible substrate and capable of electronics printing.

Biometric/fingerprint image data is processed using multiple steps. Specifically, the biometric readout from scanner 12 (FIG. 1) is converted to digital data via the aforementioned analog-to-digital converter. Thereafter, image processing can be applied for noise reduction and better contrast. Several fingerprint features can be extracted by the controller to evaluate the image quality. In addition the card 10 (FIG. 1) can request re-sampling to the reader 16 or 20 (FIG. 3 or FIG. 4, respectively) for re-swapping. Processed data can then be compressed by either conventional compression scheme or fingerprint feature extraction methodology and data can be further encrypted for security. Before RF transmission, error-correction bits can be added using channel coding and data transmission success will be evaluated and checked by RFID reader 16 or 20 (FIG. 3 or FIG. 4, respectively). Still yet, card 10 (FIG. 1) exchanges verification data with RFID reader 16 or 20 (FIG. 3 or FIG. 4, respectively).

In one example, biometric/fingerprint data will be transmitted from card 10 (FIG. 1) to RFID reader 16 or 20 (FIG. 3 or FIG. 4, respectively). Specifically, before security encoding the data/information, the following will occur: key exchange information; static card information (RFID and/or smart chip/IC) encoding; and dynamic information (e.g., biometric/fingerprint information) encoding. Then, after security coding, channel coding and error correction data is applied.

II. Illustrative Embodiments

Figure 10A:
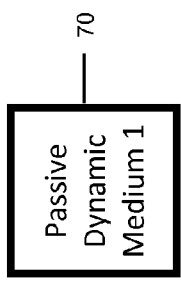
FIGS. 10A-C depict a set of input flows according to an embodiment of the present invention.
Figure 10B:
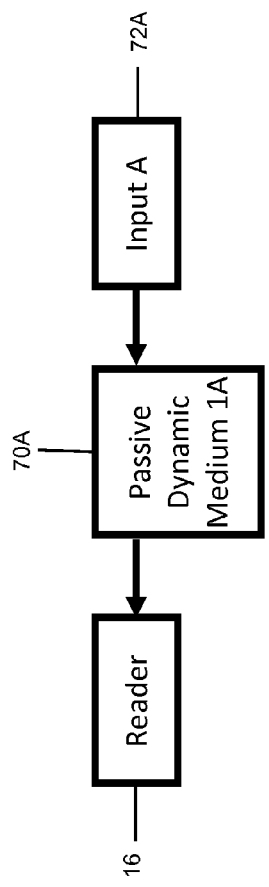
Figure 10C:
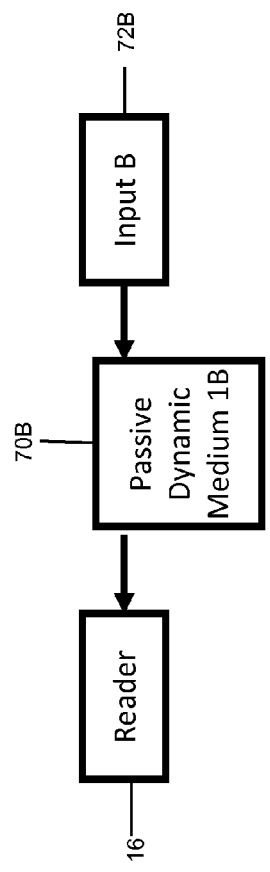

FIGS. 10A-C depict a set of input flows according to an embodiment of the present invention. Specifically, in FIGS. 10A-C, passive medium 70 by itself lacks dynamic information when it is not powered by a reader 16. Along these lines, the passive medium will update dynamic information (e.g., biometric/fingerprint data) corresponding to its input. As shown, when there is an input 72 A, medium 70A updates its dynamic information, uniquely corresponding to the properties of input 72A. Similarly, when there is an input 72B, medium 70B updates its dynamic information, uniquely corresponding to the properties of input 72B.

Figure 11A:
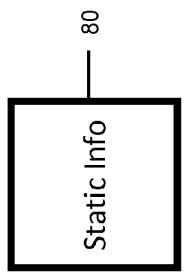
FIGS. 11A-C depict a set of user flows according to an embodiment of the present invention.
Figure 11B:
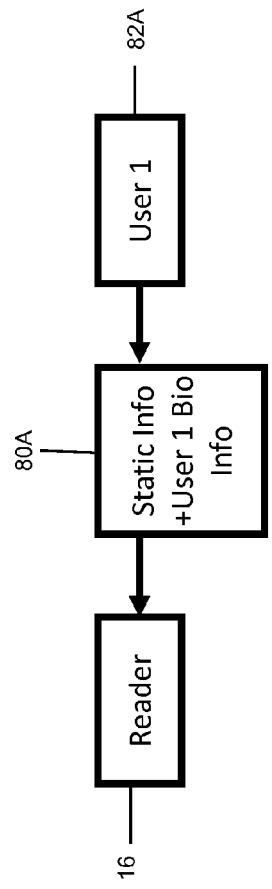
Figure 11C:
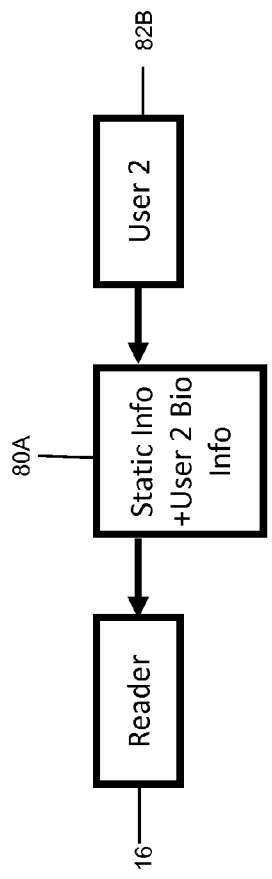

In FIGS. 11A-C, the communication of static information with dynamic information is shown. As depicted, two different users 72A-B will produce two different biometric readings that will be combined with static information 80A-B and communicated to RFID reader 16.

Figure 12:
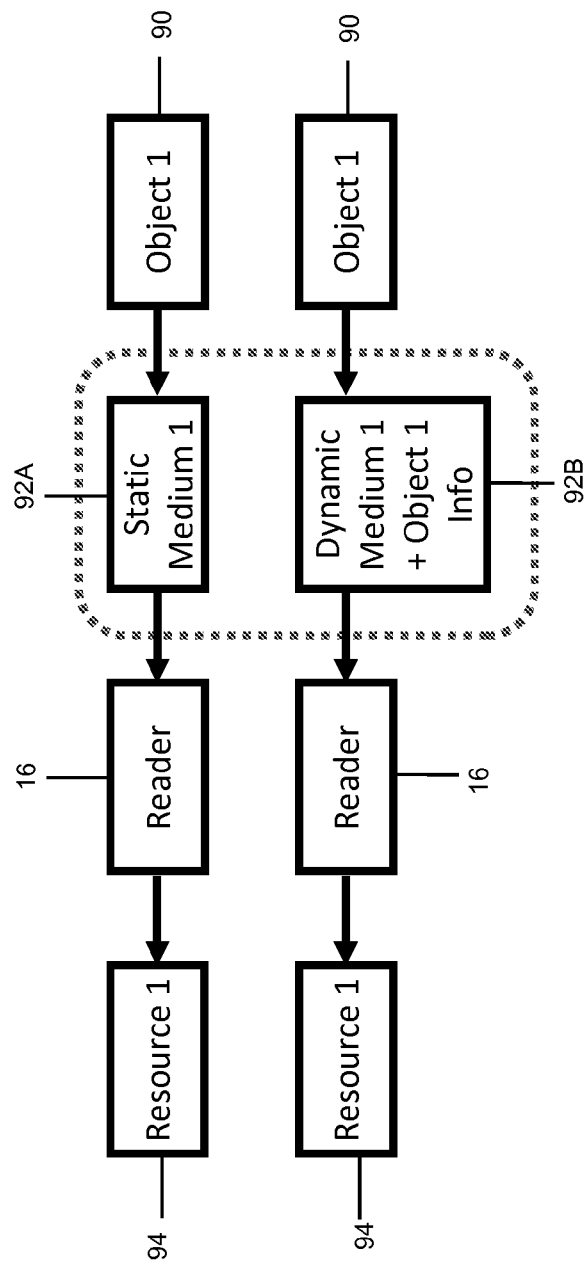
FIG. 12 depicts a set of object flows according to an embodiment of the present invention.

FIG. 12 depicts a set of object flows according to an embodiment of the present invention. A medium changes information within the object's custom use of a conventional medium. In FIG. 12, the medium 92A acts and is used in a similar manner as previously employed. Therefore the user will not suffer from additional requirements when the invented dynamic medium 92B is used. As shown, object 90 feeds media 92A-B, which are communicated to reader 16 to access resource 94.

Figure 13:
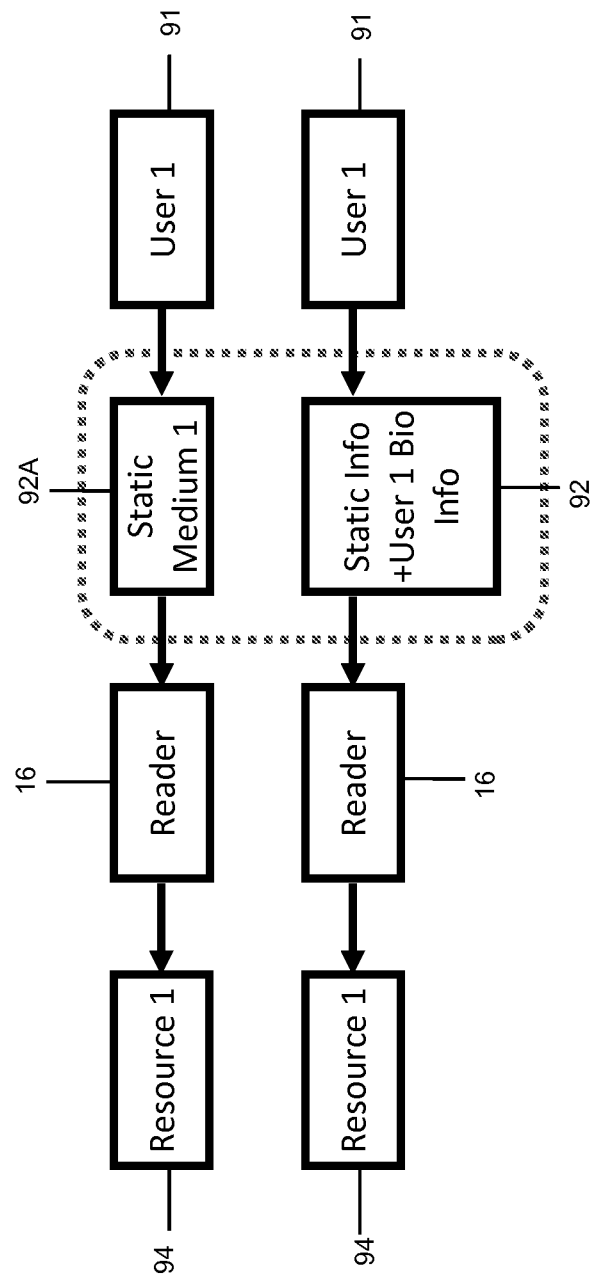
FIG. 13 depicts a set of user flows according to an embodiment of the present invention.

FIG. 13 depicts a set of user flows according to another embodiment of the present invention. Similar to FIG. 12, in FIG. 13, a user 90 feeds both static medium 92A and static information and biometric information 92C, which are communicated to RFID reader 16 to access resource 94.

Figure 14A:
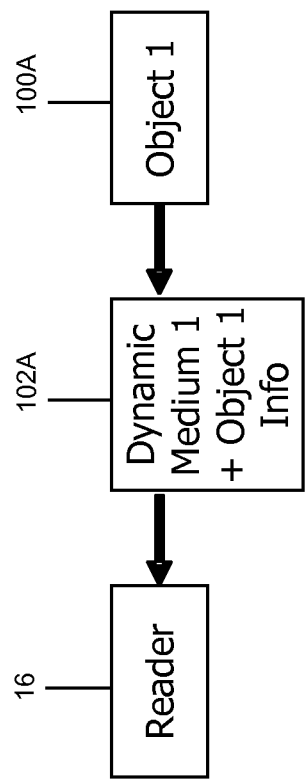
FIGS. 14A-B depict a set of object flows according to an embodiment of the present invention.
Figure 14B:
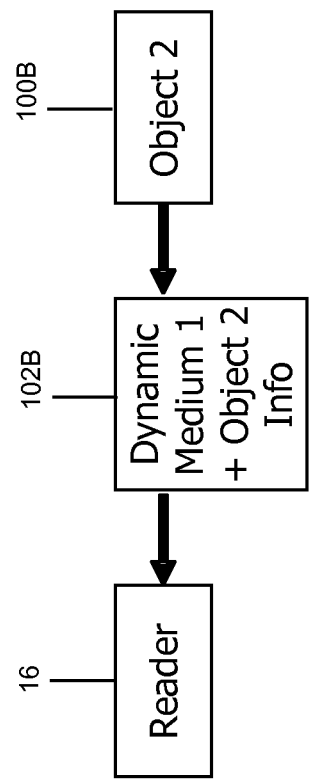

Based on these concepts, it can be seen that a medium changes information using object's active biometric information. Specifically, FIGS. 14A-B depict another set of object flows according to an embodiment of the present invention. In FIGS. 14A-B, the dynamic medium 102A-B captures user's unique biometric information 100A-B, such as fingerprint, dynamically and passively, whether it is an authorized user or not. This information is communicated to reader 16.

Figure 15A:
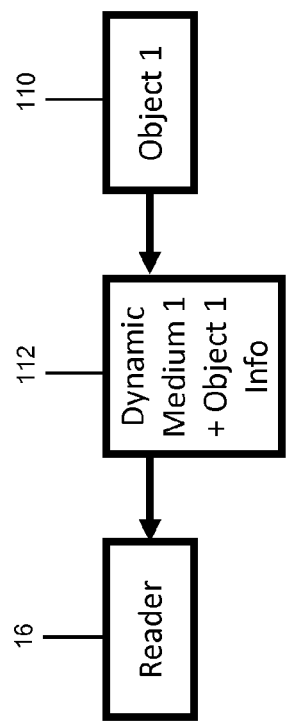
FIGS. 15 A-C depict a set of object flows according to an embodiment of the present invention.
Figure 15B:
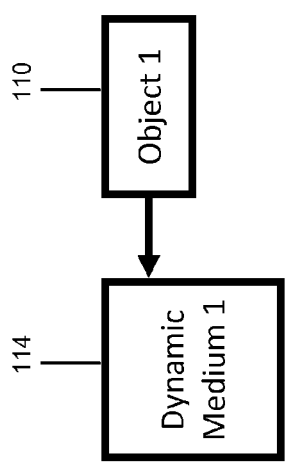
Figure 15C:
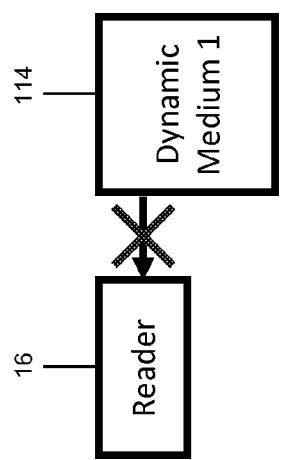
Figure 16A:
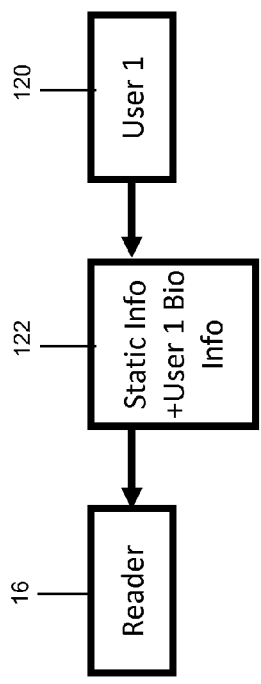
FIGS. 16A-C depict a set of user flows according to an embodiment of the present invention.
Figure 16B:
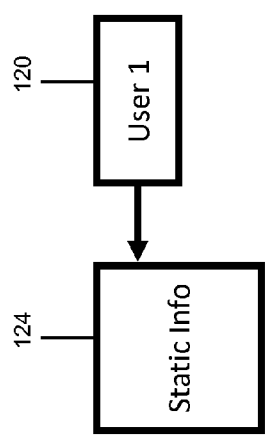
Figure 16C:
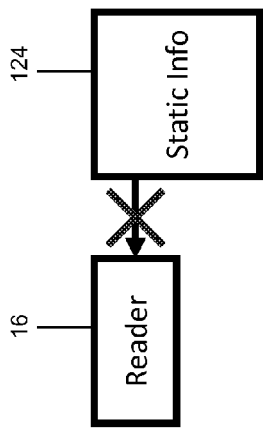

Under the embodiments of the present invention, a medium activates only when object intends to use. This concept is shown in FIGS. 15 A-C, which depict a set of object flows according to another embodiment of the present invention. In these figures, the proposed dynamic biometric medium 114 is activated to collect biometric information 112 such as from fingerprints 110 only when: a user uses the card with a designated reader 16; and the user holds the card with his/her fingers. A similar concept is shown in FIGS. 16A-C that demonstrates that a card 10 (FIG. 1) is activated only when a user 120 uses card 10 and he/she approaches reader 16. As further shown in FIGS. 16A-B, static information 124 is combined with user 120's biometric information and communicated to reader 16 upon activation of the medium.

Figure 17:
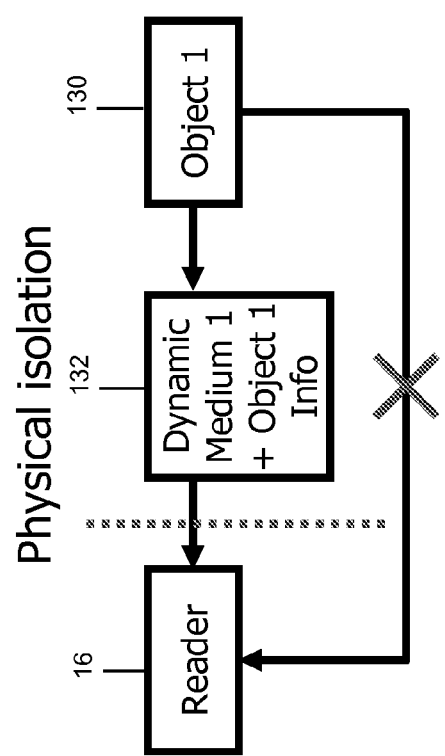
FIG. 17 depicts physical isolation based on a dynamic medium according to an embodiment of the present invention.

FIG. 17 depicts physical isolation based on a dynamic medium according to an embodiment of the present invention. In general, a medium physically isolates an object from medium access. In FIG. 17, the user biometric information 132 (yielded from object 130) is physically isolated from the RFID reader 16. This implementation is safe from contagious diseases and unintended biometric information capture.

Figure 18:
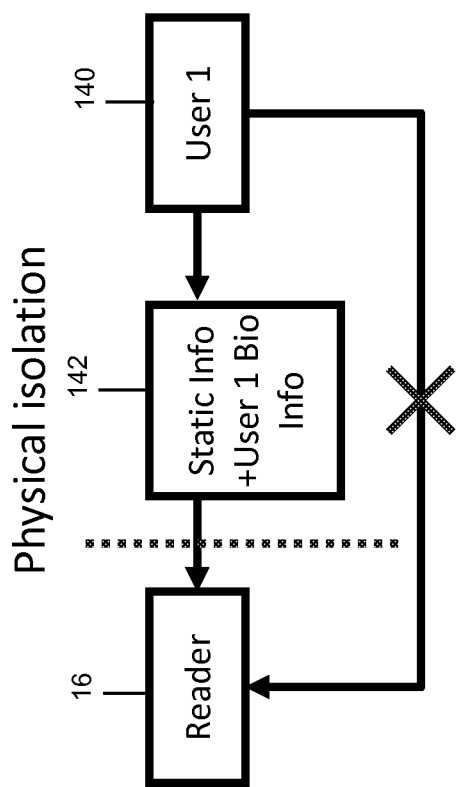
FIG. 18 depicts physical isolation based on a static medium according to an embodiment of the present invention.

FIG. 18 depicts physical isolation based on a static medium according to an embodiment of the present invention. As shown, a medium (having static and dynamic/biometric information 142 thereon) physically isolates the user 140 from uncontrolled environments such as a shared RFID reader 16 by scanning biometric information passively.

Figure 19A:
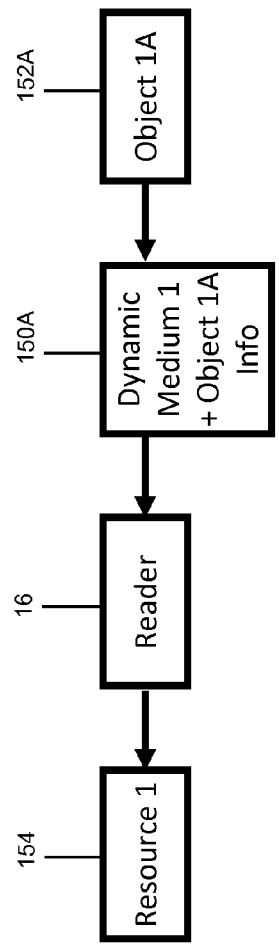
FIGS. 19A-C depict a set of object flows according to an embodiment of the present invention.
Figure 19B:
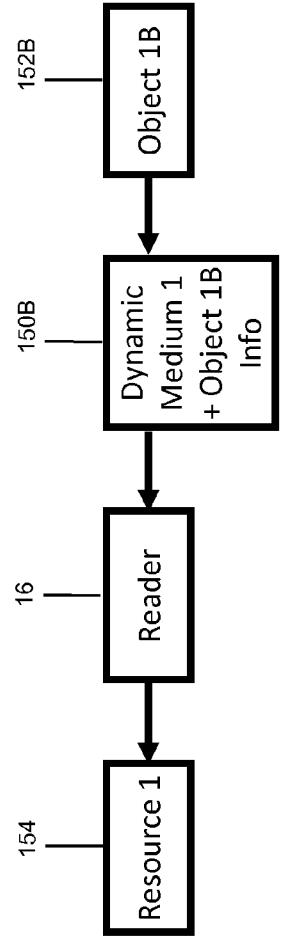
Figure 19C:
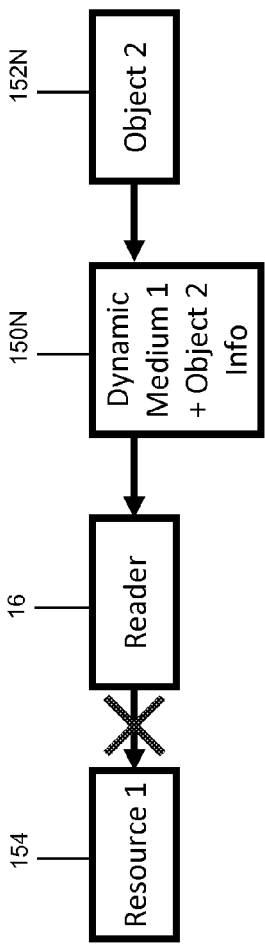

FIGS. 19A-C depict a set of object flows according to an embodiment of the present invention. Specifically, FIGS. 19A-C demonstrate that a medium identifies objects exclusively. FIGS. 19A-B demonstrate that dynamic biometric media 150A-B can contain different aspects of user biometric information (derived from objects 152A-B) to authorize access to a given resource 154 via reader 16. FIG. 19C shows that unauthorized user biometric information contained on medium 150N (as derived from object 152N) prevents access to resource 154.

Figure 20A:
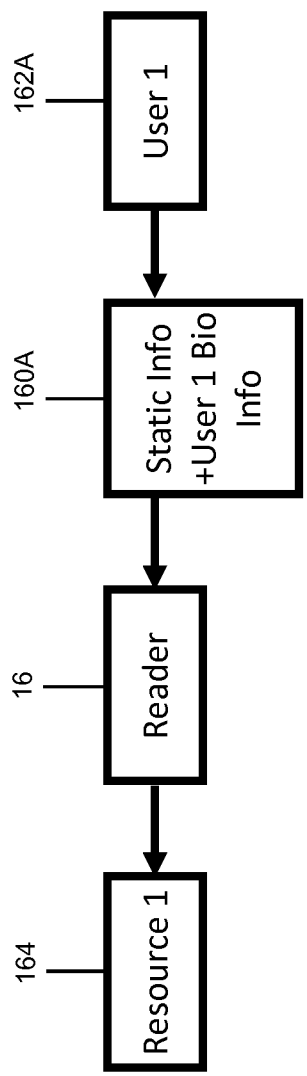
FIGS. 20A-B depict a set of user flows according to an embodiment of the present invention.
Figure 20B:
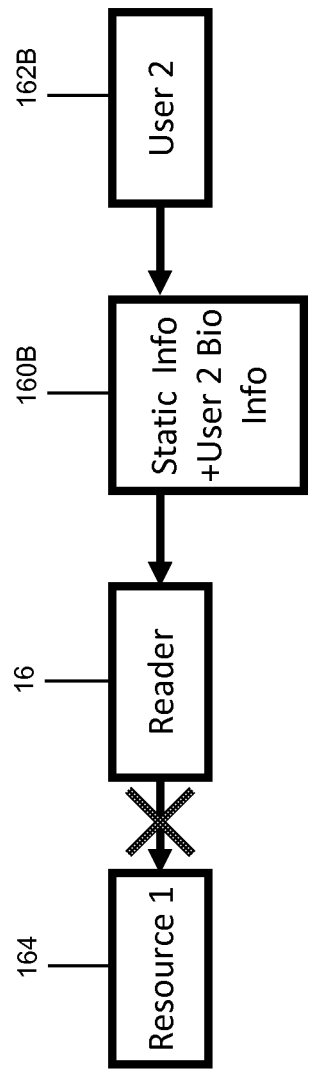

FIGS. 20A-B depict a set of user flows according to an embodiment of the present invention. Specifically, FIGS. 20A-B show that a card-based approval system such as that described herein identifies a user exclusively by using biometric fingerprints. As shown (and as mentioned above), each user 162A-B will produce unique biometric data that is combined with static information 160A-B and communicated to RFID reader 16 to access resource 164.

Figure 21:
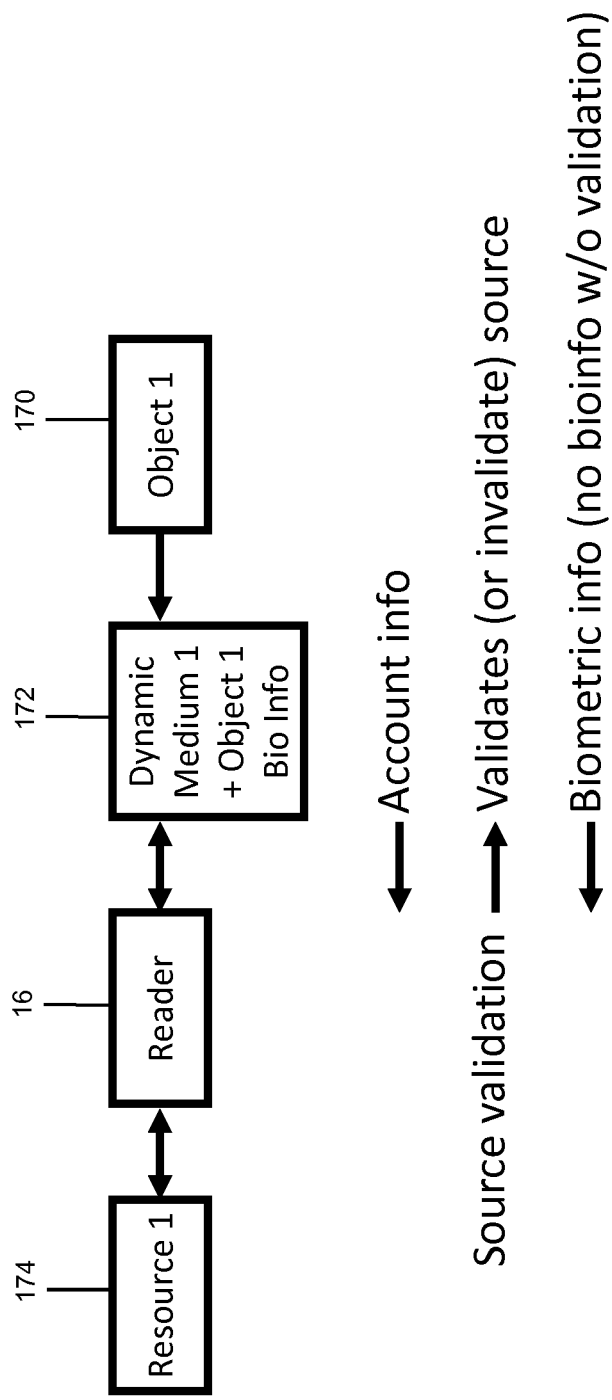
FIG. 21 depicts a source validation flow according to an embodiment of the present invention.

FIG. 21 depicts a source validation flow according to an embodiment of the present invention. As shown, object 170 produces biometric information that is recorded to dynamic medium 172 and communicated to reader 16 for accessing resource 174. Under this embodiment, the dynamic biometric card 172 evaluates source validation information received from the reader and resource 174 to continue or terminate the further communication. Along these lines, a RFID internal non-volatile memory can be used to keep track of source validation.

Figure 22:
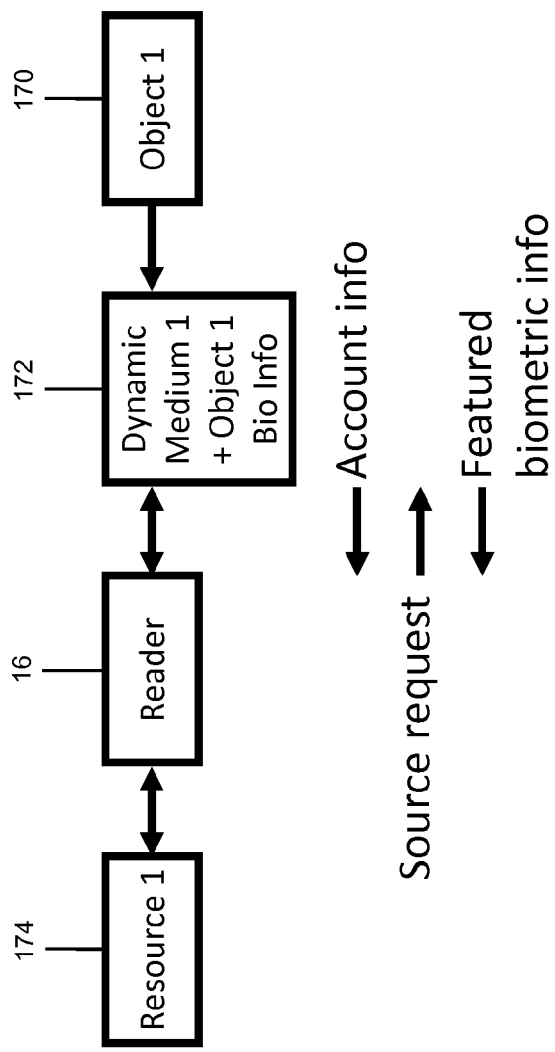
FIG. 22 depicts a source request flow according to an embodiment of the present invention.

FIG. 22 depicts a source request flow according to an embodiment of the present invention. Specifically, similar to FIG. 21, FIG. 22 shows object 170 yielding biometric information that is recorded on dynamic medium/card 172 that is communicated to reader 16 to access resource 174. Along these lines, a source requests specific biometric information to be acquired by the dynamic medium 172, rather than the whole image. Based on this request, dynamic medium 172 extracts requested biometric feature(s) from the fingerprints/objects 170

Based on the foregoing, these collective embodiments can provide one or more of the following features: (1) fingerprint feature extraction: specific aspects of fingerprints can be extracted randomly or with a pre-determined method; (2) image compression: fingerprint images can be compressed to reduce data size; and/or (3) biometric data security: fingerprints and communications can be encrypted for security In addition, the teachings recited herein enable one or more of the following concepts/features:

A method of fingerprint biometric authentication (e.g., a credit card transaction);

A passive sensor array to capture user biometric information using external power source;

A passive sensor array embedded in the conventional form factor;

A credit card medium changes information dynamically;

A medium changes information within object's custom use of conventional medium;

A medium changes information using object's active information

A medium activates only when object intends to use the medium;

A medium physically isolates the object from the medium access;

A medium identifies object(s) exclusively;

A medium authorizes an authorized user's access to the resource;

A medium that verifies and validates the reader and resource;

A medium that selectively captures and extracts fingerprint information;

A medium that uses resource request to process fingerprints; and/or

A passive medium that compresses and encrypts fingerprints.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A dynamic information radio-frequency identification (RFID) card, comprising:
a RFID card medium comprising:
a RFID chip positioned in the RFID card medium for enabling RFID-based authentication of the user;
a smart chip positioned in the RFID card medium for enabling further authentication of the user based on data stored in the smart chip; and
a fingerprint scanner positioned on the card medium for receiving an analog fingerprint reading from a user, and for authentication, at a reader, of the user based on the analog fingerprint reading, the fingerprint scanner comprising:
a sensor array for capturing the analog fingerprint reading as analog fingerprint image data, the sensor array comprising a series of addressable sensor elements in a column-row format;
a controller for processing the analog fingerprint image data into digital fingerprint image data; and
an RF block and an antenna for communicating the digital biometric image data to the reader for the authentication.

2. The dynamic information RFID card of claim 1, the sensor array being coupled to a set of decoders for decoding the analog fingerprint reading.

3. The dynamic information RFID card of claim 1, the RFID card medium further comprising a credit card.

4. A dynamic information radio-frequency identification (RFID) card, comprising:
a RFID card medium comprising:
a smart chip positioned in the RFID card medium for enabling further authentication of the user based on data stored in the smart chip;
a RFID chip positioned in the RFID card medium for enabling RFID-based authentication of a user; and
a fingerprint scanner positioned on the card medium for receiving an analog fingerprint reading from the user, wherein the fingerprint scanner is configured to communicate an analog fingerprint reading as analog fingerprint image data to a reader for authentication at the reader, the fingerprint scanner comprising:
a sensor array for capturing the analog fingerprint image data, the sensor array comprising a series of addressable sensor elements in a column-row format;
a controller for processing the analog fingerprint image data into digital fingerprint image data; and
an RF block and an antenna for communicating the digital fingerprint image data for authentication.

5. The dynamic information RFID card of claim 4, the sensor array being coupled to a set of decoders for decoding the analog fingerprint reading.

6. The dynamic information RFID card of claim 4, the RFID card medium further comprising a credit card.

7. A dynamic information radio-frequency identification (RFID) card, comprising:
a RFID card medium;
a RFID chip positioned in the RFID card medium for enabling RFID-based authentication of a user;
a smart chip positioned in the RFID card medium for enabling further authentication of the user based on data stored in the smart chip; and
a fingerprint scanner positioned on the card medium for receiving an analog fingerprint reading from the user, and for authenticating the user based on the analog fingerprint reading, wherein the fingerprint scanner comprises:

a sensor array for capturing analog fingerprint image data, and wherein the sensor array comprises a series of sensor elements arranged in a column-row format, and wherein the fingerprint scanner is configured to communicate the fingerprint reading as analog fingerprint image data to a reader for authentication at the reader;

a controller for processing the analog fingerprint image data into digital fingerprint image data; and an RF block and an antenna for communicating the digital fingerprint image data for authentication.

8. The dynamic information RFID card of claim 7, the sensor array being coupled to a set of decoders for decoding the analog fingerprint reading.

9. The dynamic information RFID card of claim 7, the RFID card medium further comprising a credit card.

* * * * *